United States Patent [19]

Grana

[11] 4,445,870
[45] May 1, 1984

[54] APPARATUS FOR OBSERVING FRAMED ITEMS

[76] Inventor: Gary G. Grana, 1224 N. Race, Arlington Heights, Ill. 60004

[21] Appl. No.: 388,018

[22] Filed: Jun. 14, 1982

[51] Int. Cl.³ ............................................. G09B 25/00
[52] U.S. Cl. ......................................... 434/76; 40/900
[58] Field of Search ............................ 40/900; 272/13; 350/288, 297; 434/74, 75, 76, 77, 78, 79, 80, 371, 428, 429

[56] References Cited

U.S. PATENT DOCUMENTS

| | | | |
|---|---|---|---|
| 389,198 | 9/1888 | Castan | 272/13 |
| 890,246 | 6/1908 | Myers | 40/900 X |
| 1,246,076 | 11/1917 | Fairbanks | 434/79 |
| 1,518,680 | 12/1924 | Arnot | 350/297 |
| 1,590,011 | 6/1926 | Donahue | 350/288 X |
| 2,301,274 | 11/1942 | Greiser | 434/76 |
| 3,564,734 | 2/1971 | Abraham | 434/76 |

Primary Examiner—Harland S. Skogquist
Attorney, Agent, or Firm—Donnie Rudd

[57] ABSTRACT

An apparatus for allowing purchasers of framed photographs, paintings, or the like to observe how the framed photograph or painting will appear in its ultimate environment by providing a table surface for the item to sit on, the table surface having interchangeable colors or patterns, and a reflective or mirrored surface to make the reflective surface appear to be a vertical plane.

1 Claim, 3 Drawing Figures

APPARATUS FOR OBSERVING FRAMED ITEMS

BACKGROUND OF THE INVENTION

This invention relates to an apparatus for showing framed photographs or paintings or the like and how they will appear on a vertical wall.

More particularly, this invention relates to an apparatus that will allow the purchaser of framed photographs, or paintings or the like to observe how they will appear on the wall of the home after purchase.

One of the problems most frequently encountered in the sale of framing items, including the matting used as a background, is that the purchaser of a framed item, such as a photograph or painting, cannot either remember the color of the wall on which the item is to be placed or else does not have a feel for how the item will look when placed on the wall. Other than simply setting the painting on a table with a background, there has been no readily available apparatus for allowing the purchaser to see how the painting will look in its ultimate position.

If a purchaser is able to able to look at a photograph in its ultimate color environment, it will be much easier for the supplier to consummate the sale of the frame and matting to be included with the item. Also, the purchaser will be able to make a more reasoned decision on the purchase and will be happier and more satisfied with the ultimate product.

It follows that, if some means can be developed to allow the purchaser to observe a framed photograph or painting in its ultimate state, both the person selling the framed photograph or painting and the consumer will derive substantial benefits therefrom.

SUMMARY OF THE INVENTION

Therefore, it is an object of this invention to provide an apparatus which allows a purchaser of a framed photograph or painting to observe the framed photograph or painting in its ultimate environment.

A further object of this invention is to provide a compact and easily transportable apparatus for allowing sales people to show framed photographs and paintings to purchasers in a manner as they will appear in their ultimate environment.

It is still another object of this invention to provide a device for allowing framed photographs or paintings to be observed in their ultimate environment by use of readily interchangeable patterns or colors to reflect the surface of the ultimate environment.

These and other objects of this invention are accomplished by an apparatus for allowing purchasers of framed photographs, paintings or the like to observe how the framed photograph or painting will appear in its ultimate environment, said apparatus comprising: a base, said base having a table surface, essentially along a horizontal plane, for placing a framed item thereon, and said table surface terminating at side edges; means for changing the color or design of the table surface; a mirrored surface, said mirrored surface extending from one of the side edges of the table surface upward at an angle of from 40° to 50° in order to allow an object placed on the table surface to appear as if it were on a vertical surface.

BRIEF DESCRIPTION OF THE DRAWINGS

Throughout the specification and the drawings which form a part of this specification, the same numeral is used to refer to the same part, even when the same part appears in different figures of the drawing.

DESCRIPTION OF THE PREFERRED EMBODIMENT

Figure 1:
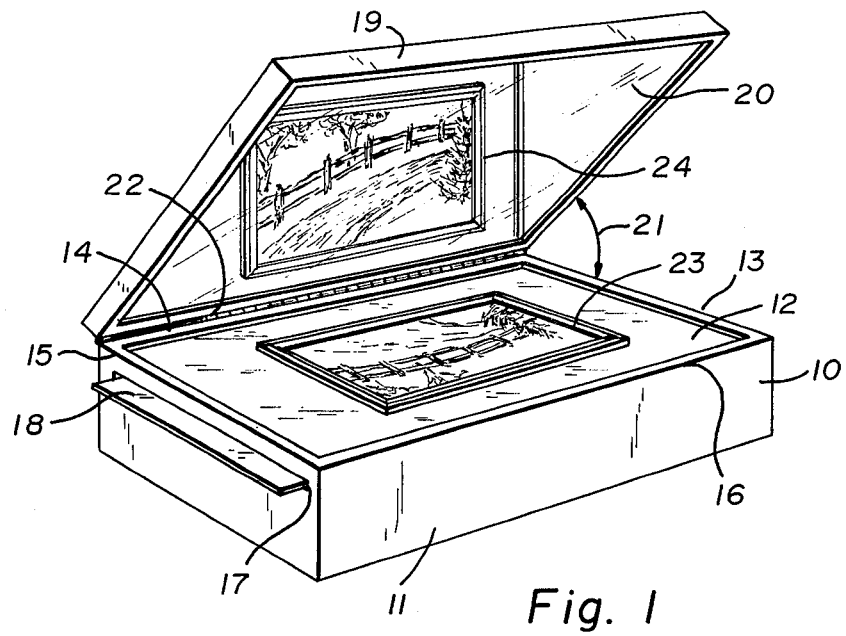
FIG. 1 depicts a perspective view of the apparatus 10.
Figure 2:
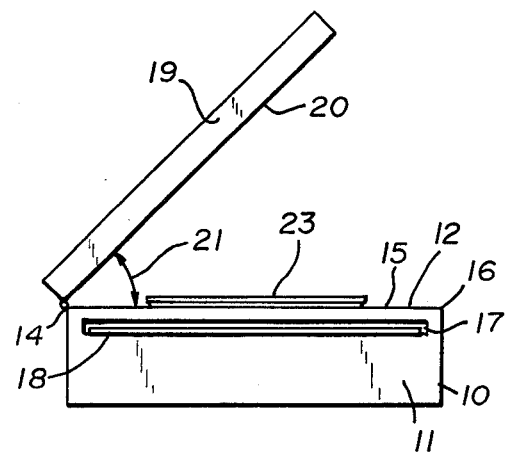
FIG. 2 depicts a side view of the apparatus 10.
Figure 3:
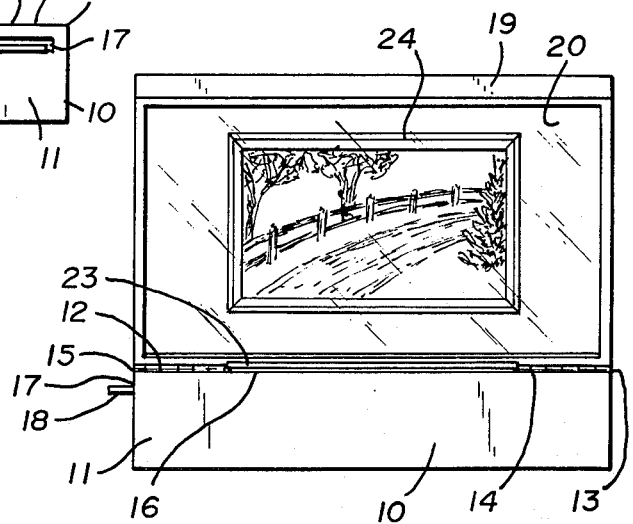
FIG. 3 depicts a front view of the apparatus 10.

The apparatus 10 of this invention includes a base 11 which has a table surface 12 which in operation sits in a horizontal plane. The table surface 12 terminates in side edges 13, 14, 15, and 16. The table surface 12 is made of a transparent material. A slot 17 in one side of the base enables panels 18 of different colors and descriptions to be inserted underneath the transparent table thereby changing the color or pattern on the table. A top portion 19 has a mirrored or reflective surface 20 and in operation, the angle 21 between the surface 20 and the surface 12 is between 40° and 50°. The top portion and the base portion are ideally connected by a hinge 22 which allows the portions to be hinged one on top of the other when the apparatus is not in use. The top portion is held in the appropriate angle either by stiffness of the hinge or by some other support, not shown.

In operation, the unit is opened at the appropriate angle. The panel 18 is placed in the slot and the panel is of a color and pattern of the wall on which the picture or photograph will be hung. The picture or photograph 23 is placed on the table portion and the reflection of the picture or photograph 24 appears as if the picture or photograph were hanging on the wall.

While I have illustrated the preferred embodiment of this invention, it is obvious that slight modifications including types of material and framework may be included so long as the invention is as set forth herein.

Having fully described this invention, I claim:

1. An apparatus for allowing purchasers of framed photographs, paintings or the like to observe how the framed photograph or painting will appear in its ultimate environment, said apparatus consisting essentially of:
   a base, said base having a stationary transparent table surface, essentially along a horizontal plane, for placing a framed item thereon, and said stationary transparent table surface terminating at side edges;
   means for changing the color or design of the table surface said means for changing the color or design of the table surface consisting essentially of a slotted section below the table surface for inserting various colored panels one at a time therein, and various colored panels of a size suitable for insertion therein;
   a reflecting mirrored surface, said reflecting mirrored surface connected to a side edge by a hinged connection and extending from one of the side edges of the table surface upward at an angle of from 40° to 50° in order to allow an object placed on the table surface to appear as if it were on a vertical surface.

* * * * *